United States Patent
Fattah et al.

(10) Patent No.: US 10,091,089 B2
(45) Date of Patent: Oct. 2, 2018

(54) STORING AND EXPIRING NON-TCP TRAFFIC

(71) Applicant: Microsoft Technology Licensing, LLC, Redmond, WA (US)

(72) Inventors: Hossam Fattah, Bellevue, WA (US); Praveen Balasubramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 15/239,651

(22) Filed: Aug. 17, 2016

(65) Prior Publication Data

US 2018/0034719 A1    Feb. 1, 2018

Related U.S. Application Data

(60) Provisional application No. 62/367,373, filed on Jul. 27, 2016.

(51) Int. Cl.
| | |
|---|---|
| H04L 12/26 | (2006.01) |
| H04L 29/08 | (2006.01) |
| H04L 29/06 | (2006.01) |

(52) U.S. Cl.
CPC .......... *H04L 43/16* (2013.01); *H04L 67/1029* (2013.01); *H04L 67/1031* (2013.01); *H04L 69/16* (2013.01)

(58) Field of Classification Search
CPC . H04L 43/16; H04L 67/1031; H04L 67/1029; H04L 69/16
See application file for complete search history.

(56) References Cited

U.S. PATENT DOCUMENTS

| | | |
|---|---|---|
| 6,247,058 B1 | 6/2001 | Miller et al. |
| 6,950,400 B1 | 9/2005 | Tran et al. |
| 8,078,825 B2 | 12/2011 | Oreland et al. |
| 8,171,227 B1 | 5/2012 | Goldschmidt et al. |
| 8,737,407 B2 | 5/2014 | Shetty et al. |
| 8,959,095 B2 | 2/2015 | Pope et al. |
| 8,972,602 B2 | 3/2015 | Mithyantha |
| 8,996,920 B2 | 3/2015 | Fattah |

(Continued)

FOREIGN PATENT DOCUMENTS

JP    2006279531 A    10/2006

OTHER PUBLICATIONS

Akhter, et al., "Solutions to Thread Issues in Parallel Programs", Retrieved on: Jul. 1, 2016 Available at: https://www.google.co.in/url?sa=t&rct=j&q=&esrc=s&source= web&cd=1&cad=rja& uact=8&    ved=0ahUKEwibpLWv7d7NAhVJOo8 KHQ9aB9EQFggdMAA& url=http%3A%2F%2Fwww.edn.com% 2FPdf%2FViewPdf%3FcontentItemId%.

(Continued)

*Primary Examiner* — Abdullahi E Salad
(74) *Attorney, Agent, or Firm* — Arent Fox LLP

(57) ABSTRACT

Present disclosure provides techniques for dynamically determining how to store and expire non-TCP traffic in a network environment. In some examples, aspects of the present disclosure may implement a state machine operated by the server for managing non-TCP traffic. Critically, in accordance with aspects of the present disclosure, non-TCP traffic may be combined with the use of multiple memory partitions and an expiry algorithm that supports dynamic scaling of non-TCP traffic while achieving faster connection speed, higher system performance, and lower time complexity.

20 Claims, 10 Drawing Sheets

(56) References Cited

U.S. PATENT DOCUMENTS

| | | |
|---|---|---|
| 2002/0091636 A1* | 7/2002 | Carroll Bullard ... G06Q 20/102 705/40 |
| 2002/0161894 A1 | 10/2002 | Tapperson |
| 2007/0133419 A1* | 6/2007 | Segel ................ H04L 47/10 370/236 |
| 2010/0046378 A1* | 2/2010 | Knapp ............ H04L 41/0604 370/242 |
| 2013/0138876 A1 | 5/2013 | Wang |
| 2014/0304231 A1 | 10/2014 | Kamath et al. |
| 2014/0304354 A1 | 10/2014 | Chauhan et al. |
| 2015/0046086 A1 | 2/2015 | Krauss |

OTHER PUBLICATIONS

"Will creating partitions reduce locking and how do we implement this in sql-server?", Published on: Jan. 3, 2012 Available at: http://dba.stackexchange.com/questions/5295/will-creating-partitions-reduce-locking-and-how-do-we-implement-this-in-sql-serv.

Fattah, et al., "Analysis of Frame-Based Fair Queueing under Self-Similar Traffic", In Publication of Springer, Jan. 2002, 4 pages.

"Transmission Control Protocol", Published on: Sep. 1981 Available at: https://tools.ietf.org/pdf/rfc793.pdf.

Postel, "User Datagram Protocol", Published on: Aug. 28, 1980 Avaialble at: https://www.ietf.org/rfc/rfc768.txt.

Postel, "Internet Control Message Protocol", Published on: Sep. 1981 Available at: https://www.ietf.org/rfc/rfc0792.txt.

"Scalable Networking: Eliminating the Receive Processing Bottleneck-Introducing RSS", In White Paper of Microsoft WinHEC, Apr. 2004, 17 pages.

"International Search Report and Written Opinion Issued in PCT Application No. PCT/US2017/040783", dated Oct. 2, 2017,14 Pages.

* cited by examiner

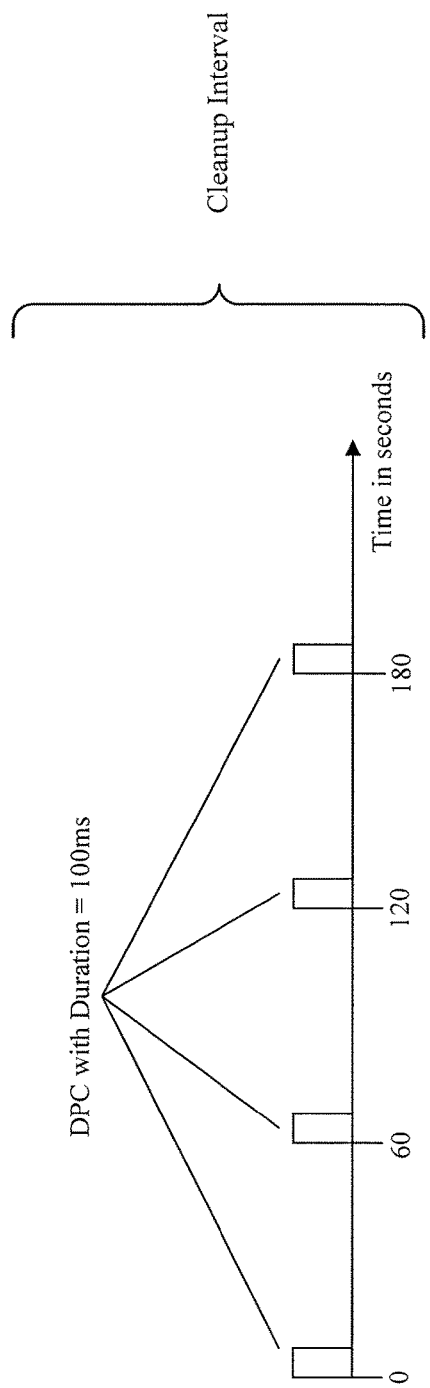
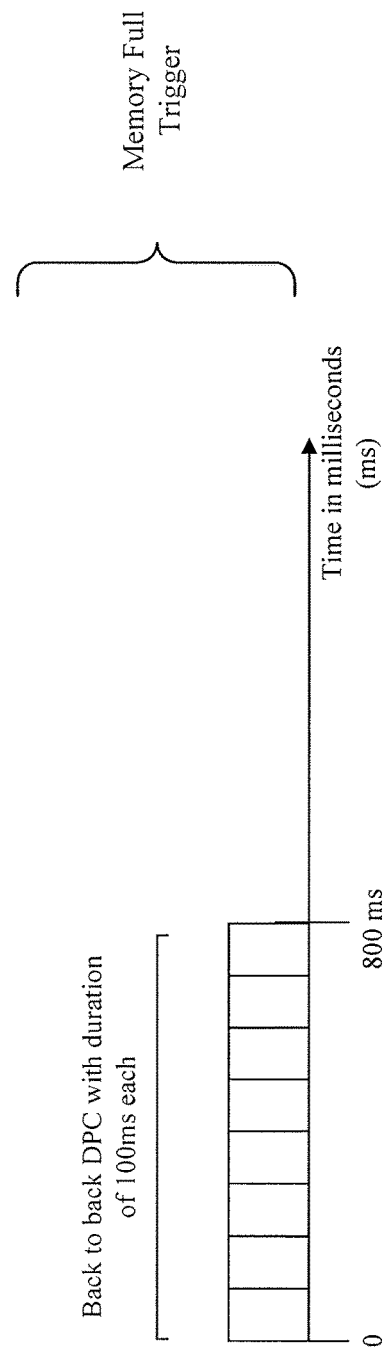
FIG. 5A
FIG. 5B

STORING AND EXPIRING NON-TCP TRAFFIC

CLAIM OF PRIORITY UNDER 35 U.S.C. § 120

The present application claims priority to Provisional Application No. 62/367,373 entitled "STORING AND EXPIRING NON-TCP TRAFFIC," and filed Jul. 27, 2016, which is assigned to the assignee hereof and hereby expressly incorporated by reference herein.

BACKGROUND

In recent years, implementation of "cloud-based" services, high-performance computing (HPC), compute servers, and other activities employing data centers and the like have seen widespread adoption. Under a typical data center installation, a large number of servers installed in server chassis and server racks are interconnected in communication using network links (e.g., Ethernet) and various switching mechanisms. The data center systems generally rely on a "pull" paradigm where the resources may be stored at the server site and clients may be allowed to pull the resources from the server by issuing one or more requests to the server. For example, with respect to a client application such as a web browser, the client application may communicate with the server using an application-level protocol, e.g., HyperText Transfer Protocol (HTTP), built on top of the Transport Control Protocol (TCP). However, not all internet applications use TCP. Non-TCP applications are constantly growing and generating non-TCP traffic at the servers, and may include applications such as internet audio players, internet protocol (IP) telephony, videoconferencing, and real-time applications.

In some cases, performance of the network can be impacted by any number of factors, including bandwidth congestion and inefficient memory utilization. Resolving potential issues may be flow type determinative. Particularly, because TCP traffic (e.g., information related to and/or including the exchange of data packets using TCP) is a "connection-oriented" traffic and non-TCP traffic (e.g., information related to and/or including the exchange of data packets not using TCP) is a "connection-less traffic," the server may resolve one or more issues that arise differently depending on the type of traffic that is being processed. For example, upon encountering congestion, all contending TCP flows reduce their data rates in an attempt to dissolve the congestion while non-TCP flows continue to send at their original rate even after encountering bandwidth congestion, thus resulting in potential packet loss. Storing states and information about non-TCP traffic may also be important for network firewall operations and packet authorization.

Conventional systems fail to address the diverging characteristics of non-TCP traffic in terms of memory utilization. However, determining how to store and when to expire (e.g., delete) information related to TCP and non-TCP traffic from memory may be critical for efficient memory utilization and improving network performance. For example, storing information related to non-TCP traffic in a single data structure (e.g., table) may result in resource contention if multiple processors or threads attempt to access the same resource concurrently. In contrast, storing information related to the non-TCP traffic across a large number of non-TCP traffic data structures may consume higher memory, higher central processing unit (CPU) utilization, and result in frequent creation and insertion of traffic information. In particular, consuming memory, CPU, or other system resources is crucial and of utmost importance for kernel-mode services, applications, and drivers. In kernel-mode environment, inefficient services can lead to poor system performance, failures, and crashes.

SUMMARY

In some examples, a method, apparatus, and a computer readable medium are provided that addresses the above-identified issues of dynamically determining how to store and expire non-TCP traffic in a network environment. In some examples, the present disclosure may implement a state machine operated by the server for managing non-TCP traffic. In particular, in some examples, the non-TCP traffic may be combined with the use of multiple memory partitions and an expiry algorithm that supports dynamic scaling of non-TCP traffic while achieving faster connection speed, higher system performance, and lower time complexity.

In some examples, the present disclosure provides a system that adopts multiple partitions and hashing tables that may be scalable according to the number of active processors or threads. In some aspects, an optimal hashing function may be utilized to ensure uniform distribution of non-TCP traffic across the multiple partitions. Additionally or alternatively, a state machine implemented by the server may manage the lifetime of non-TCP traffic by relying on either cleanup intervals that scale with the number of stored traffic in the system or is based on memory event triggers that may cleanup the expired non-TCP traffic from the memory based on the memory availability.

In accordance with one example of the present disclosure, a method of managing non-TCP packets is disclosed. The method may comprise monitoring, at a server, a non-TCP endpoint parameter in a memory of the server. In some aspects, the method may further include determining whether the non-TCP endpoint parameter is outside of a range defined by a lower threshold and an upper threshold. In some examples, the lower threshold and the upper threshold may be either respective numbers of non-TCP endpoints stored in the memory or respective memory utilization values corresponding to the non-TCP endpoints stored in the memory. The method may further include adjusting an endpoint lifetime value and a cleanup interval value associated with maintaining the non-TCP endpoints stored in the memory in response to the non-TCP endpoint parameter being outside the range defined by the lower threshold and the upper threshold. Additionally or alternatively, the method may include removing one or more of the non-TCP endpoints from the memory of the server in response to at least one of the adjusted endpoint lifetime value and the adjusted cleanup interval value.

In accordance with another example of the present disclosure, a computer device for managing non-TCP packets is disclosed. The computer device may include a processor and a memory coupled to the processor. In some examples, the memory may include instructions executable by the processor to monitor, at a server, a non-TCP endpoint parameter in a memory of the server. In some aspects, the instructions may further include determining whether the non-TCP endpoint parameter is outside of a range defined by a lower threshold and an upper threshold. The lower threshold and the upper threshold may be either respective numbers of non-TCP endpoints stored in the memory or respective memory utilization values corresponding to the non-TCP endpoints stored in the memory. The instructions may further be executable by the processor to adjust an endpoint lifetime value and a cleanup interval value associated with maintaining the non-TCP endpoints stored in the memory in response to the non-TCP endpoint parameter being outside the range defined by the lower threshold and the upper threshold. Additionally or alternatively, the instructions may include removing one or more of the non-TCP endpoints from the memory of the server in response to at least one of the adjusted endpoint lifetime value and the adjusted cleanup interval value.

In accordance with yet another example, a computer readable medium for managing non-TCP packets is disclosed. The computer-readable medium may include instructions for monitoring, at a server, a non-TCP endpoint parameter in a memory of the server. In some aspects, the instructions may further include determining whether the non-TCP endpoint parameter is outside of a range defined by a lower threshold and an upper threshold. The lower threshold and the upper threshold may be either respective numbers of non-TCP endpoints stored in the memory or respective memory utilization values corresponding to the non-TCP endpoints stored in the memory. The instructions may further include adjusting an endpoint lifetime value and a cleanup interval value associated with maintaining the non-TCP endpoints stored in the memory in response to the non-TCP endpoint parameter being outside the range defined by the lower threshold and the upper threshold. Additionally or alternatively, the instructions may include removing one or more of the non-TCP endpoints from the memory of the server in response to at least one of the adjusted endpoint lifetime value and the adjusted cleanup interval value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIGS. 5A-5C are timing diagrams illustrating memory cleanup procedures based on various triggers in accordance with aspects of the present disclosure.

DETAILED DESCRIPTION

Figure 1:
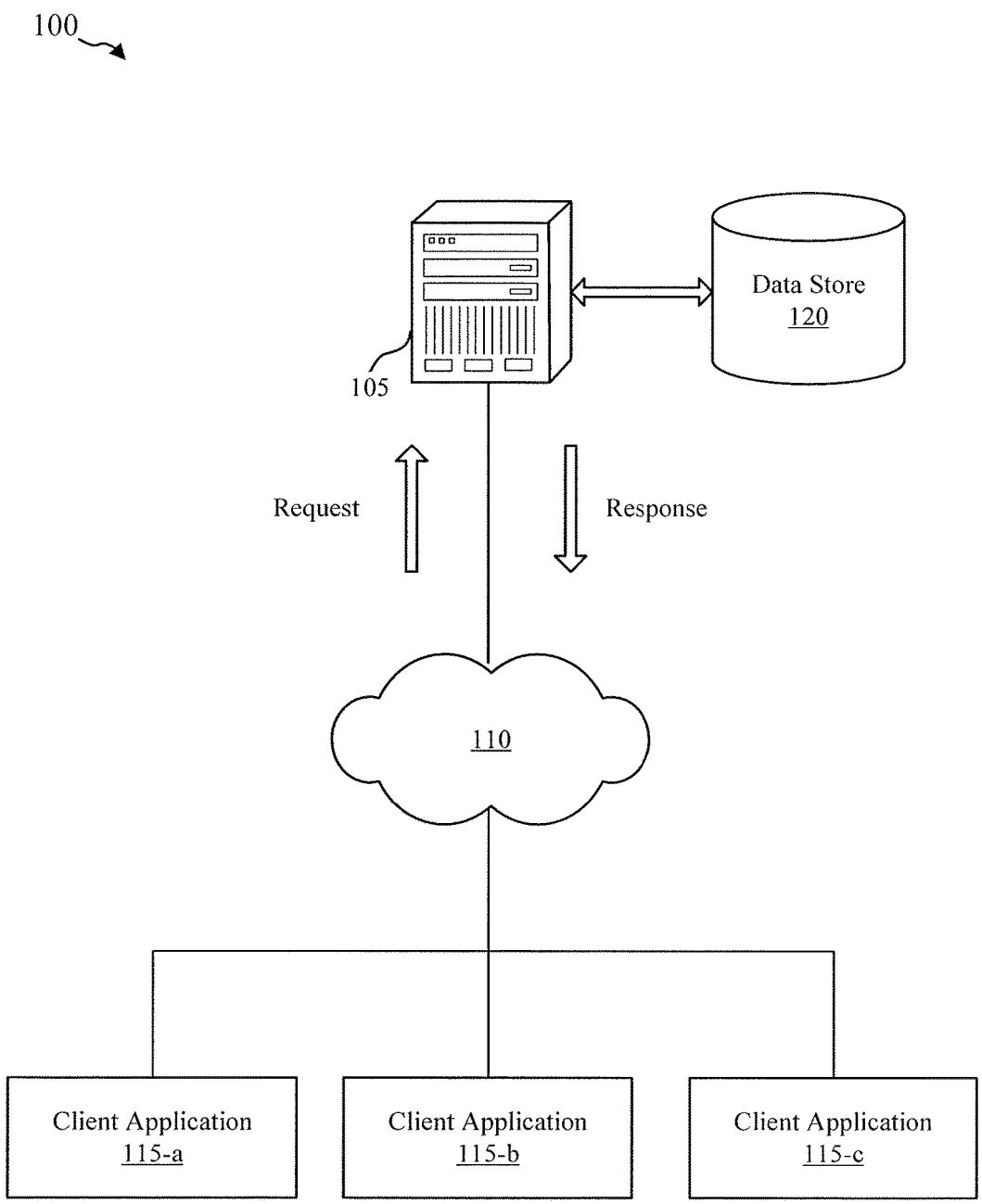
FIG. 1 is a diagram illustrating an example of network architecture in which the present aspects may operate.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some examples, the present disclosure may address the problem identified in the conventional systems where the partitions are generally fixed or predetermined irrespective of the number of active processors in the system or the amount of endpoints that needed to be stored. The conventional systems therefore suffer in memory and CPU utilization because storing information related to non-TCP traffic, referred to herein as "non-TCP endpoint information" or "non-TCP endpoints," in a single data structure may result in a resource contention if there are multiple processors or multiple threads accessing the same resource at the same time. Conversely, storing the non-TCP traffic endpoint information across a large number of memory partitions based on predetermined conditions may consume higher memory and CPU power that generally results from creation and insertion of traffic into large partitions. Further, such systems may suffer from slower look up operations and network speeds because a system must look across a large number of partitions for the endpoint entry in a table. For the purposes of the present disclosure, the term "endpoint" may refer to a non-TCP connection which is defined by a local endpoint and a remote endpoint. By extension, the term "endpoint lifetime" may specify a length of time that a non-TCP endpoint has to be inactive in order to be classified as idle in the memory.

Therefore, in some examples, the present disclosure employs a state machine for storing information of the non-TCP traffic that is combined with the use of multiple memory partitions and an expiry algorithm to support dynamic scaling of number of non-TCP traffic while at the same time achieving faster connection speed, higher system performance, and lower time complexity. For example, the state machine operates to dynamically adjust an expiry rate of non-TCP endpoints based on either a number of endpoints stored in a memory of the system, e.g., to account for changes in an incoming rate of new endpoints (e.g., creation rate) or a memory utilization factor. In one embodiment, the system and method may be implemented in a kernel mode (as opposed to the user mode application) where an application may have access to the system memory. Thus, in such situation, if the kernel mode fails to manage the memory usage properly, the failure may result in the system crash. In other words, the state machine dynamically adjusts the expiry rate based on the incoming rate to avoid the memory from becoming full, which would lead to packet losses. In some implementations, a computer device may dynamically adjust the number of memory partitions based on the number of processors (e.g., as the processors/cores are hot added or removed). Additionally or alternatively, the computer device disclosed herein distributes the information of the non-TCP traffic across the multiple memory partitions in a uniform manner. For example, some implementations may utilize an optimal hash function (e.g., Teoplitz hash) that achieves uniform distribution of non-TCP traffic across the multiple partitions. As such, no one partition may be over utilized while one or more partitions are underutilized. In further aspects, the computer device discussed in the present disclosure may employ (comprise) a state machine (see FIGS. 4A and 4B) that manages endpoint lifetime and memory cleanup operations (e.g., Deferred Procedure Call (DPC)) may utilize cleanup intervals to allow sufficient and routine removal of idle non-TPC endpoints as their numbers increase in the memory. The term "idle" may specify a time period (e.g., "endpoint lifetime value") during which stored information relating to a particular non-TCP endpoint has not been accessed. Thus, in some aspects, the computer device may identify the number of non-TCP endpoints that are stored in one or more partitions of the memory that have not been accessed for a particular time period (e.g., 60 seconds (s)).

Accordingly, in some examples, the state machine efficiently manages the memory to remove idle non-TCP endpoints by dynamically adjusting an endpoint removal rate to be equal to or greater than an endpoint creation rate (i.e., number of endpoints that are being entered into the memory). As such, the present aspects may achieve improved performance of the system. Absent the techniques described herein, the addition of an increasing number of non-TCP endpoints without adequate removal would lead to an unsustainable system. Also, such a system would be unresponsive, provide slower connection speed, and lookup or retrieval from the hash tables, thereby negatively effecting the quality of service.

Turning first to FIG. 1, a network system 100 includes a computer device 105 (e.g., server) in communication with one or more client application(s) 115 (e.g., client application 115-a, client application 115-b, and client application 115-c) over a network 110. In some examples, the network 110 may be wired or wireless network. The computer device 105 may also be in communication with data store 120 that may include data (e.g., TCP or non-TCP traffic/data packets) requested by the one or more client application(s) 115.

In some examples, the one or more client applications 115 may be configured to establish a TCP connection or non-TCP connection with the computer device 105. For example, with respect to client application 115 such as a web browser, the client application 115 may communicate with computer device 105, e.g., the server, using an application-level protocol HTTP built on top of the TCP. However, not all internet applications use TCP. As noted above, non-TCP traffic applications are constantly growing, and may include client applications 115 such as internet audio players, internet protocol (IP) telephony, videoconferencing, real-time applications, and the like.

Non-TCP traffic, including User Datagram Protocol (UDP) and Internet Control Message Protocol (ICMP), may be required for network and Internet connectivity. Deciding on how to store and when to expire non-TCP traffic may be critical for the connection speed, security, and overall system performance. Additionally, based on the characteristics of TCP packets and non-TCP packets, resolving potential issues may be flow type determinative. Particularly, because TCP traffic is a "connection-oriented" traffic and non-TCP traffic is a "connection-less traffic," the computer device 105 may resolve one or more issues that arise differently depending on the type of traffic that is being processed.

In some examples, the computer device may dynamically determine how to store and expire non-TCP traffic in a network environment. In some examples, aspects of the present disclosure may implement a state machine operated by the computer device 105 for managing non-TCP traffic. Further, the non-TCP traffic may be combined with the use of multiple memory partitions and an expiry algorithm that supports dynamic scaling of non-TCP traffic while achieving faster connection speed, higher system performance, and lower time complexity. Further details on the various techniques provided by the present disclosure are described in detail with reference to FIGS. 2-8 below.

Figure 2:
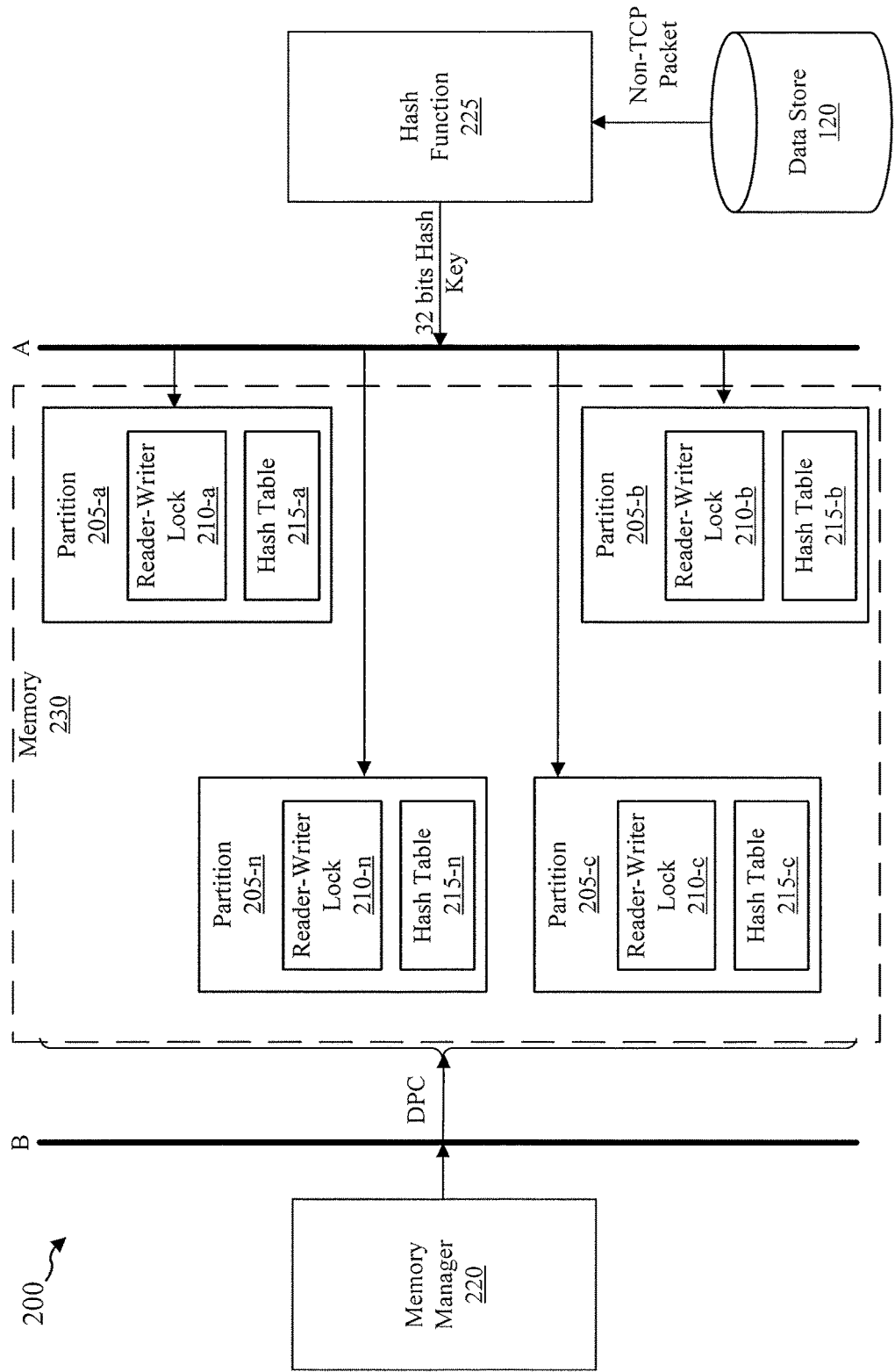
FIG. 2 is a diagram illustrating an example of memory management system implemented in a computer device (e.g., server) in accordance with various aspects of the present disclosure.

FIG. 2 is a diagram illustrating an example of memory management system 200 implemented in a computer device 105 in accordance with various aspects of the present disclosure. In some examples, the memory management system 200 may include a memory manager 220 in communication with the memory 230 to manage storage and expiry of information related to non-TCP traffic, e.g., non-TCP endpoints. In some aspects, the memory management system 200 may be part of the computer device 105 as described with reference to FIG. 1. For reference, interface "A" in FIG. 2 may be an interface for endpoint insertion, lookup and deletion. In contrast, interface "B" may be an interface for endpoint expiry as described in accordance with aspects of the present disclosure.

In some examples, the memory 230 may include one or more (e.g., up to any number n) memory partitions 205 (specifically partition 205-a, partition 205-b, partition 205-c, and partition 205-n). Further, each memory partition 205 may include memory locations, e.g., a hash table 215 in this example, for storing information related to respective non-TCP endpoints. In an aspect, the number n may be determined based on the number of active processors (see FIG. 8) or threads that are in the computer device 105. Thus, in this example, computer device 105 may be configured to dynamically adjust the number of partitions 205-a to 205-n and hash tables 215-a to 215-n associated with the one or more partitions 205 according to the number of active processors. In some aspects, each non-TCP endpoint may be uniformly stored into one of the plurality of hash tables 215 such that no one partition 205 is over utilized in comparison to the other partitions 205 created in the memory 230. In some aspects, the number of partitions 205 may be adjusted if there is a hot add or removal event (e.g., an event that indicates a core has been added or removed from the system without restarting the machine hardware).

The memory management system 200 may further include one or more (e.g., up to any number n) reader-writer locks 210 such that each lock is associated with a different partition 205, thus avoiding contentions on a single lock by a plurality of processors. In some examples, the one or more non-TCP packets may be retrieved from data store 120 as described with reference to FIG. 1. The computer device 105 may utilize a uniform distribution mechanism, such as but not limited to a hash function 225 (e.g., Toeplitz hash function), such that each non-TCP endpoint or data packet may be hashed into one of the plurality of partitions 205. The hash function 225 may ensure uniform distribution for the number of endpoints stored in each partition 205. Features of the hash function 225 are described in further detail with reference to FIG. 3 (infra).

In some aspects, memory manager 220 may be configured to implement DPC cleanup intervals of the one or more partitions 205. Particularly, the computer device of the present disclosure may use multiple states (see state-machine FIGS. 4A and 4B) for describing endpoint lifetime and cleanup intervals that are based on the number of endpoints in the system. For instance, in one example, if the number of endpoints exceeds a specified endpoint threshold (e.g., N>2,000 endpoints), the endpoint lifetime may be subsequently shortened (e.g., from 60 seconds to 30 seconds) so that an adequate number of endpoints are removed from the memory 230 in order to improve (e.g., increase a speed of) operations for endpoint lookup and retrieval.

Figure 4A:
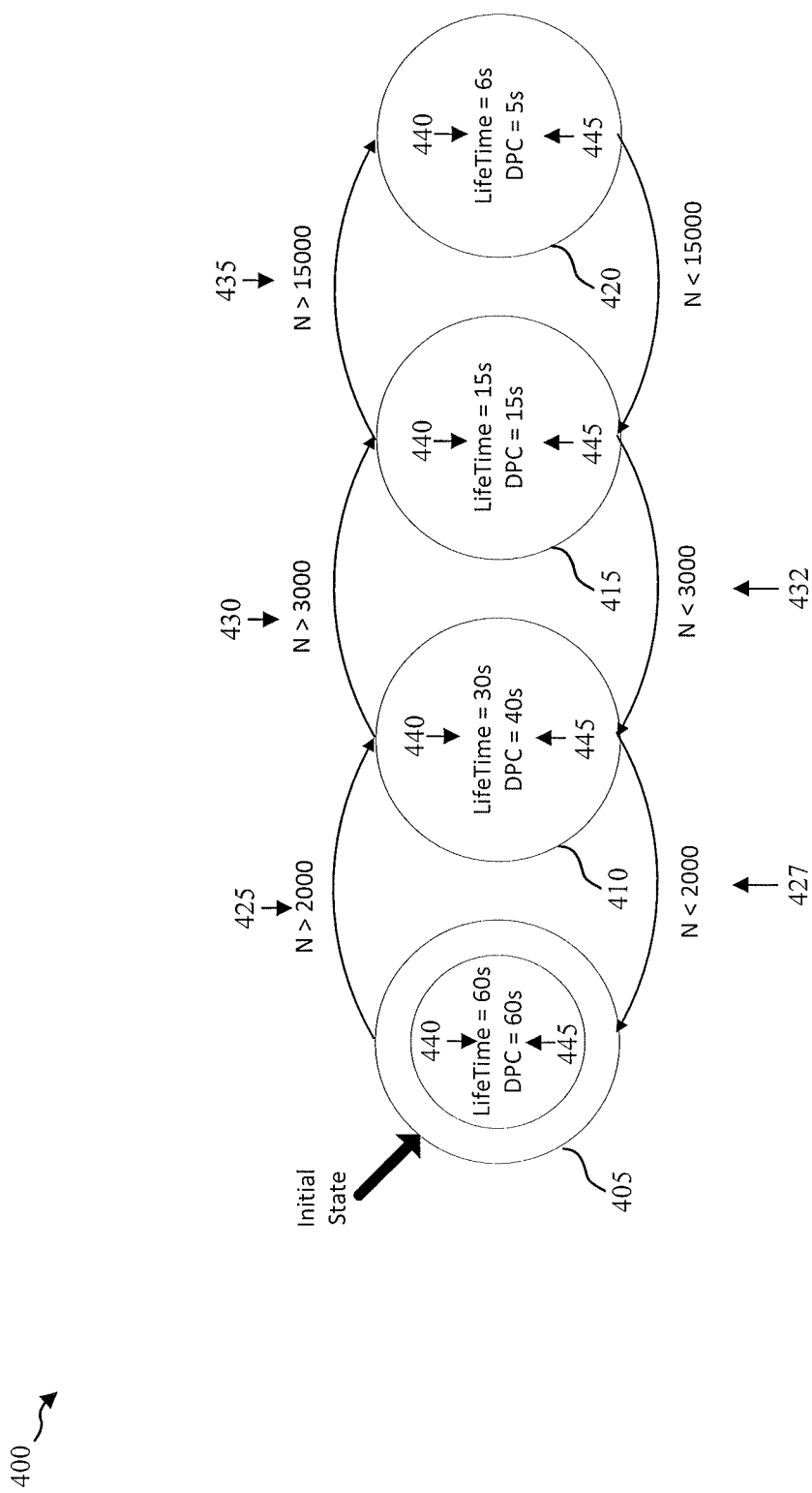
FIG. 4A is a diagram illustrating an example of state machine implemented by the computer device (e.g., server) for managing endpoint lifetime and Deferred Procedure Call (DPC) cleanup interval based on a number of stored traffic in the memory.
Figure 4B:
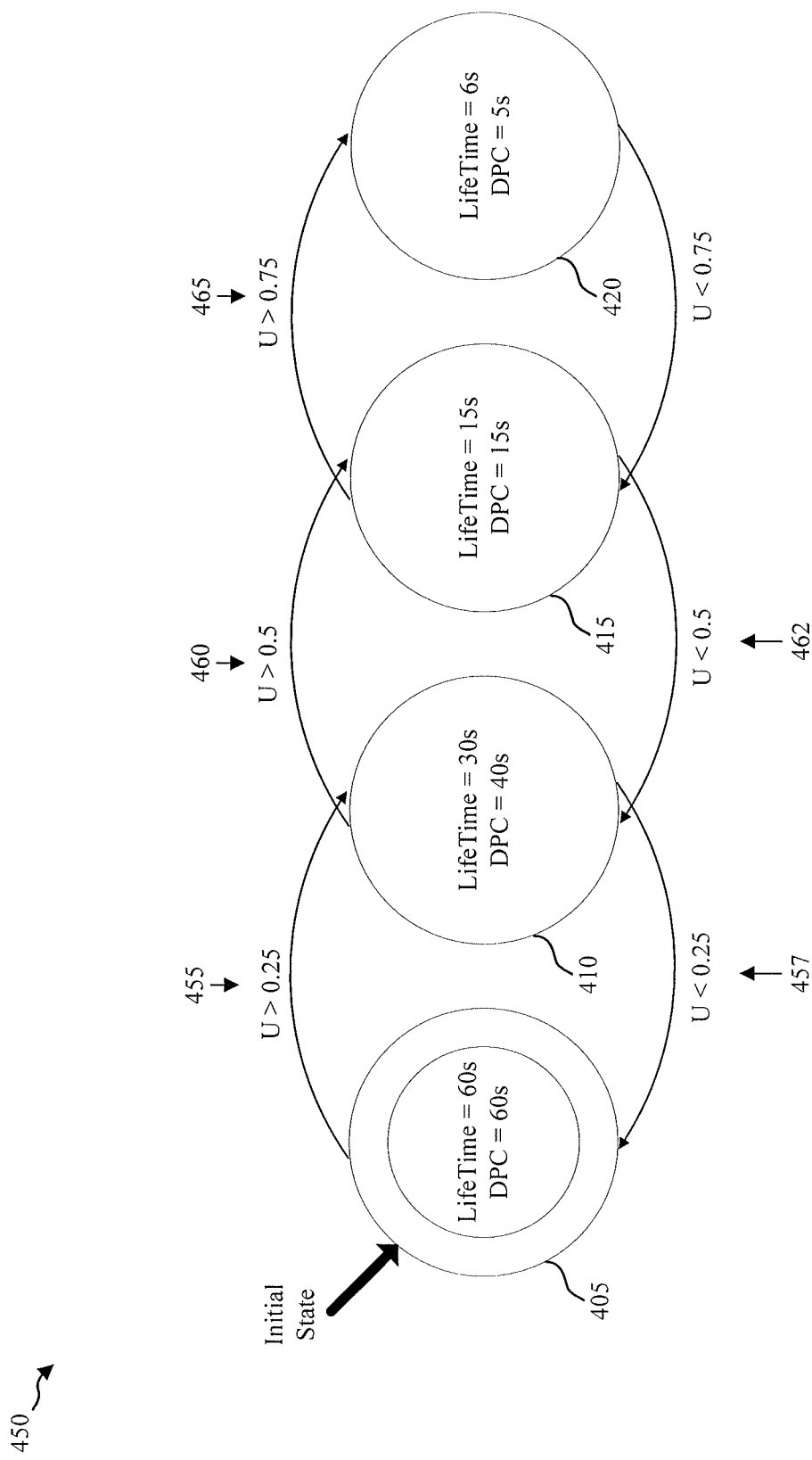
FIG. 4B is a diagram illustrating another example of state machine implemented by the computer device (e.g., server) for managing endpoint lifetime and Deferred Procedure Call (DPC) cleanup interval based on memory utilization factor.

In another example, the memory manager 220 may be configured to execute cleanup operations based on the memory utilization factor (See FIG. 4B). For example, as the utilization of memory (i.e., amount of memory that is occupied or in use) increases, the memory manager 220 may employ more aggressive techniques (e.g., via shortening endpoint lifetime and cleanup intervals) to effectively manage the overall memory of the server. Additionally or alternatively, the memory manager 220 may implement a memory availability trigger that is executed when the available system memory falls below a predetermined threshold. Thus, in this case, in order to free available memory, the computer device 105 may increase the frequency of the DPC procedures to be triggered continuously (see FIG. 5B) until such time that the available memory exceeds the predetermined threshold.

Figure 3:
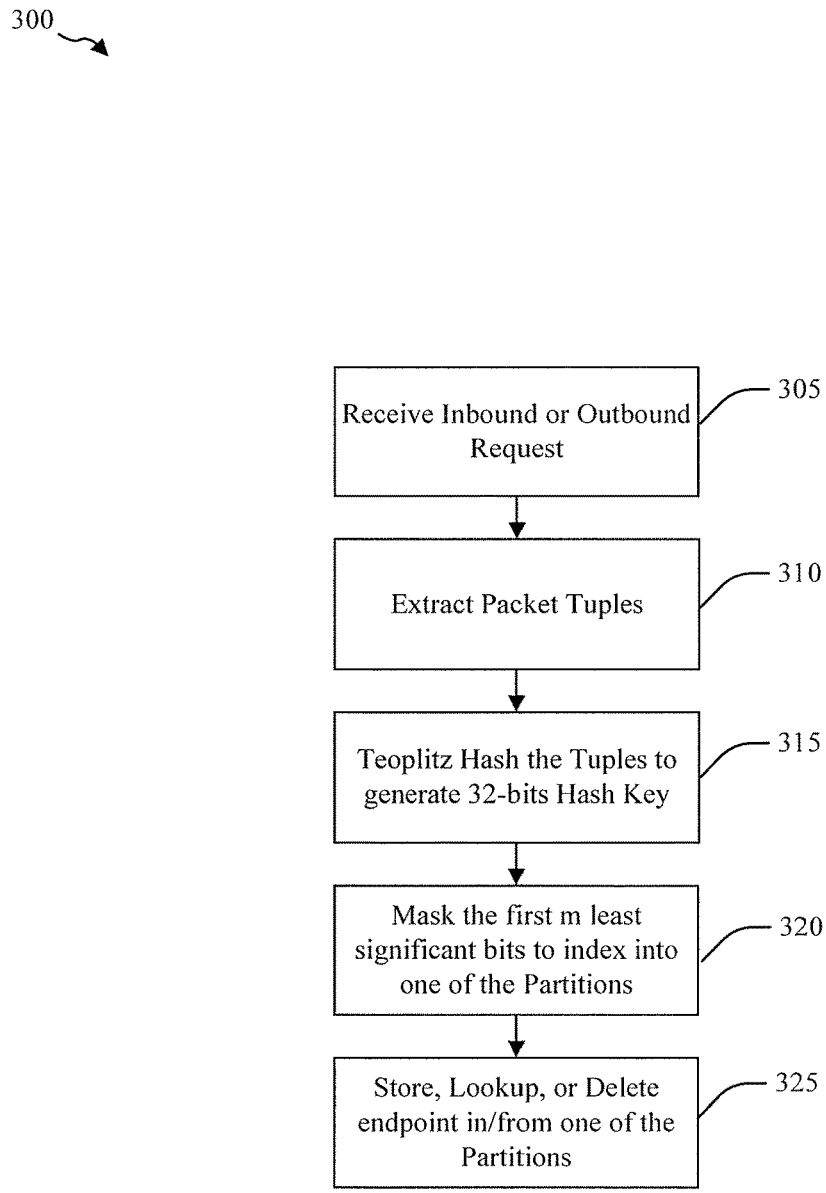
FIG. 3 is a flowchart of a method that summarizes the steps necessary to store, look-up, or delete endpoints from a target partition in accordance with aspects of the present disclosure.

FIG. 3 is a flowchart of a method 300 that summarizes the actions associated with one example implementation to store, look-up, or delete endpoints from a target partition in accordance with aspects of the present disclosure. In some aspects, computer device 105 may operate memory management system 200 to perform the actions identified in method 300.

At block 305, the method 300 may include receiving inbound or outbound request at the computer device 105. In some examples, the requests may be initiated by one or more client applications 115 or by the computer device 105, e.g., server, itself. At block 310, the method 300 may include extracting packet tuples. In one or more examples, a hash function 225 (including, but not limited to, Teoplitz hash) may be used to distribute the non-TCP endpoints evenly among the multiple partitions 205 of the memory 230. The Teoplitz hash function may provide an approximate uniform distribution for the number of endpoints across all partitions 205. In some examples, the Teoplitz hash function may be calculated from a 3-tuple (Remote IP address, Remote Port, Local Port) of the UDP packet, and in case of an ICMP packet, additional tuples may be used (ICMP ID, ICMP type, ICMP code). In both UDP and ICMP, hash function 225 may include a secret key. In some aspects, the secret key may be used to prevent a hacker, for example, from obtaining the hash key. Employment of such procedures may prevent malicious parties from issuing Denial of Service (DoS) attacks that may negatively impact the quality of service of computer device 105. Thus, at block 315, the method 300 may include using the Teoplitz hash to generate a 32-bit hash key. Although the illustrated method is described with respect to non-limiting example of a Teoplitz hash, it should be appreciated by those of ordinary skill that any alternative hashing function that may be suitable for the underlying functionalities of the state machine described herein may be used.

At block 320, the method 300 may further include masking the first in least significant bits to index the respective non-TCP endpoint into one of the plurality of partitions 205. In some examples, "m" may be an integer. The partition 205, where a non-TCP endpoint would be stored, looked-up, or deleted, may be chosen by using a part of the hash key to index into the target partition 205. A number of least-significant bits, in, from the hash key enumerating to the number of partitions 205 are used to index each endpoint into one of the partitions 205. Accordingly, at block 325, the method may include storing, looking-up or deleting endpoints from one or more of the partitions 205 based on the techniques described herein.

FIG. 4A is a diagram illustrating an example of a state machine 400 implemented by the computer device 105 (e.g., server) operating memory management system 200 for managing endpoint lifetime and DPC cleanup intervals or memory triggers based on a number of non-TCP endpoints stored in the memory. In some examples, the state machine 400 and the techniques associated with the state machine 400 may be managed and executed by the memory manager 220 (see FIG. 2) either independently or in collaboration with the processor 805 (see FIG. 8). In accordance with various aspects, the lifetime of the endpoints (e.g., non-TCP endpoints) may be maintained by a state-machine that is executed by the processor 805 (see FIG. 8) of the computer device 105. In one or more examples, the processor 805 and memory manager 220 may be jointly or independently responsible for managing the memory 230 of computer device 105 in accordance with the state machine 400 described herein.

As noted previously, the term "endpoint" may refer to a non-TCP connection which is defined by a local endpoint and a remote endpoint, and information associated therewith and/or with data packets exchanged there between. In some aspects, the endpoints may also refer to the non-TCP packets received from, and/or transmitted or queued for transmission to, one or more client applications 115. Each of a configurable number of states (e.g., first state 405, second state 410, third state 415, and fourth state 420) of the state machine 400 may have a lower threshold and an upper threshold. The lower threshold and the upper threshold may be either respective numbers of non-TCP endpoints stored in the memory or respective memory utilization values corresponding to the non-TCP endpoints stored in the memory.

In one example, the lower threshold and upper threshold may define a number of endpoints that trigger a switch to another state (e.g., between first state 405 and a second state 410, second state 410 and third state 415, etc.). In the instance where the computer device determines whether the non-TCP endpoint parameter is outside of a range defined by a lower threshold and an upper threshold with respect to the number of endpoints, the lower threshold and upper threshold may be described as lower endpoint threshold and upper endpoint threshold. In some examples, the term "non-TCP endpoint parameter" may refer to a value corresponding to either a respective numbers of non-TCP endpoints stored in the memory or a value associated with the memory utilization based on the non-TCP endpoints stored in the memory.

In the illustrated non-limiting example, the first state 405, the upper endpoint threshold may be N=2000 endpoints. Because the first state 405 is the initial state, the lower endpoint threshold may be set at N=0 endpoints. Conversely, for the second state 410, the upper endpoint threshold may be, for example, N=3,000 endpoints, while the lower endpoint threshold may be N=2,000 endpoints. Thus, as will be described below, the computer device may adjust an endpoint lifetime value and a cleanup interval value in response to the non-TCP endpoint parameter being outside the range defined by the lower threshold and the upper thresholds. It should be noted that although only four states are described with reference to state machine 400, one of ordinary skill would appreciate that any number greater or less than the four states may be employed to achieve the goals of the present disclosure, e.g., depending on, for example, a level of granularity desired in managing memory 230.

Thus, as described above, at the first state 405, the upper threshold may be first upper endpoint threshold 425 set at, for example, 2,000 endpoints. During the first state 405, the lower threshold may be first lower endpoint threshold 425 set at, for example, zero endpoints. It should be appreciated by those of ordinary skill that any value for threshold levels can be established by the computer device 105, or set by an operator of the system, and the illustrated examples of a values of 2,000 and zero for first upper and lower endpoint threshold, a value of 3,000 for second upper endpoint threshold 430, a value of 2,000 for second lower endpoint threshold 437, and a value of 15,000 for third upper endpoint threshold 435 respectively illustrated in FIG. 4A should not be construed as limiting in any way.

In some aspects, each state may correspond with an endpoint lifetime value 440 and a cleanup interval value (e.g., DPC interval 445). In some examples, for the first state 405, the endpoint lifetime value may be set at first endpoint default value (e.g., 60 seconds) and the cleanup interval value may be set at a first interval default value (e.g., 60 seconds). In some examples, the term "default value" may refer to the initial value set by the computer device 105 or the adjusted value that represents the change from the initial first value to the adjusted second value. The computer device 105 may transition between different states depending on the number of endpoints, N, in the system. For example, the computer device 105 may identify a number of non-TCP endpoints that are stored in memory 230. In some examples, the computer device 105 may identify the number of non-TCP endpoints or packets that are stored in one or more partitions 205 of the memory 230.

If the computer device 105 with state machine 400 in a particular state determines that the number of non-TCP endpoints is not outside of a range defined by a lower threshold and an upper threshold, the computer device 105 would trigger DPC cleanup of idle non-TCP endpoints at the specified intervals (See FIG. 5A) based on the endpoint lifetime value and the cleanup interval value defined for the specific state. In some aspects, determining the number of non-TCP endpoints that are idle may comprise determining whether a period of time since the non-TCP endpoint was accessed has exceeded an idle threshold (as defined by the endpoint lifetime value). As will be described later with reference to FIG. 5A, the DPC may be a kernel-mode procedure, and thus run for a predetermined maximum time period (e.g., 100 ms). Thus, in this example that operates during the first state 405, the DPC may be triggered every 60 seconds, wherein for each trigger, the DPC procedure may execute for 100 ms each.

However, in the case of starting in the first state 405 and considering an increase in the number of endpoints, if at any point the number of non-TCP endpoints is outside the range defined by the lower threshold and the upper threshold (e.g., if the number of non-TCP endpoints exceeds the first upper endpoint threshold of N=2,000), then state machine 400 may transition to second state 410 where the endpoint lifetime value 440 may be shortened (e.g., from 60 s to 30 s) and the DPC interval 445 may also be reduced (e.g., from 60 s to 40 s) in order to allow the system to prune (e.g., remove from one or more partitions 205 of the memory 230) greater number of endpoints as their incoming number increases. Such dynamic adjustment achieves improved performance for the system because allowing the number of endpoints to increase without pruning them at an adequate rate equal to or higher than the endpoint creation rate may eventually lead to an unsustainable system where the memory 230 may be required to carry large numbers of endpoints in the system. This leads to an unresponsive system, slower connection speed, lookup or retrieval from the partitions 205, and in one example, from the hash tables 215.

Continuing with the illustrated example, if at the second state 410, the computer device 105 determines that the number of non-TCP endpoints is further outside the second upper endpoint threshold 430 (e.g., N>3,000), then state machine 400 may transition to third state 415, where the endpoint lifetime value 440 may be further shortened (e.g., 30 s to 15 s) and the DPC interval 445 may also be additionally reduced (e.g., 40 s to 15 s) in order to allow the system to remove idle endpoints from one or more partitions 205 of the memory 230 at an increased rate. Similarly, if at the third state 415, the computer device 105 still determines that the number of non-TCP endpoints exceeds third upper endpoint threshold 435 (e.g., 15,000), the endpoint lifetime value and the DPC interval may be reduced even further (e.g., 15 s to 6 s, and 15 s to 5 s, respectively). Such situation may arise when the number of incoming requests exceeds the number of outgoing non-TCP packets.

In contrast, considering a decrease in the number of endpoints, if, at any state (e.g., such as the second state 410 in the following example), the computer device 105 determines that the number of non-TCP endpoints is outside the range defined by the lower threshold and the upper threshold (e.g., when the number of endpoints falls below the second lower endpoint threshold 427 associated with the particular state, the computer device 105 may operate state machine 400 to change states and adjust the endpoint lifetime value 440 and the DPC interval 445 to an earlier state (e.g., in one example, returning from the second state 410 to the first state 405) by increasing the endpoint lifetime and the DPC interval before the memory cleanup is required.

FIG. 4B is a diagram illustrating another example of state machine 450 implemented by the computer device (e.g., server) for managing endpoint lifetime and DPC cleanup interval based on memory utilization factor, "U", where "U"∈[0, 1] (i.e., any value between 0-1 representing level of memory that is currently in-use or occupied). In some aspects, the memory utilization factor may be a represented as a percent of total memory that is either occupied or in-use. As the utilization of memory increases, the computer device 105 may employ more aggressive techniques (e.g., reduced endpoint lifetime and frequent cleanup intervals) to effectively manage the overall memory of the server.

As with the state machine in FIG. 4A, the state machine 450 may include a plurality of configurable number of states (e.g., first state 405, second state 410, third state 415, and fourth state 420) that may be similar to the state machine 400. Each of the plurality of state machines may have an upper threshold (e.g., upper memory threshold) and a lower threshold (e.g., lower memory threshold) that defines memory utilization factor, "U" that trigger a switch to another state (e.g., between first state 405 and a second state 410) when the memory utilization is outside the range defined by the upper memory threshold and the lower memory threshold.

In some examples, the upper threshold may be a first upper memory threshold 455 set at, e.g., U=0.25 (i.e., 25% of the total memory may be occupied); between second state 410 and a third state 415, the upper threshold may be a second upper memory threshold 460 set at, e.g., U=0.50 (i.e., 50% of the total memory that may be occupied); between third state 415 and a fourth state 420, the upper threshold may be a third upper memory threshold 465 set at, e.g., U=0.75 (i.e., 75% of the total memory may be used), etc.). Similarly, at first state, the lower threshold may be set at, e.g., U=0; between second state 410 and a third state 415, the lower threshold may be a second lower memory threshold 462 set at, e.g., U=0.25 (i.e., 25% of the total memory that may be occupied), etc.). Again, although only four states are described with reference to state machine 450, it should be understood that any number greater or less than the four states may be employed to achieve the goals of the present disclosure, e.g., depending on, for example, a level of granularity desired in managing memory 230.

In some aspects, the computer device 105 may transition between different states depending on the memory utilization factor, U, in the system. For example, the computer device 105 may identify whether the memory utilization, U, is outside the range of a first upper memory threshold (e.g., U=0.25) and a first lower memory threshold to transition from the first state 405 to the second state 410. Similarly, if the cleanup operations at the second state 410 fail to keep the memory utilization below a second memory threshold (e.g., U=0.50) because, for example, the amount of incoming traffic exceeds the outgoing non-TCP packets that the computer device 105 may effectively cleanup from the system, the computer device 105 may transition to the third state 415 that employs more aggressive cleanup parameters.

Similar to state machine 400 described in FIG. 4A, here a decrease in the memory utilization, at any state (e.g., such as the second state 410 in the following example), relative to the memory threshold associated with the particular state may result in the computer device 105 to change states and adjust the endpoint lifetime value 440 and the DPC interval 445 to an earlier state (e.g., in one example, returning from the second state 410 to the first state 405) by increasing the endpoint lifetime and the DPC interval before the memory cleanup is required when the memory utilization falls below the lower memory thresholds.

Figure 5C:
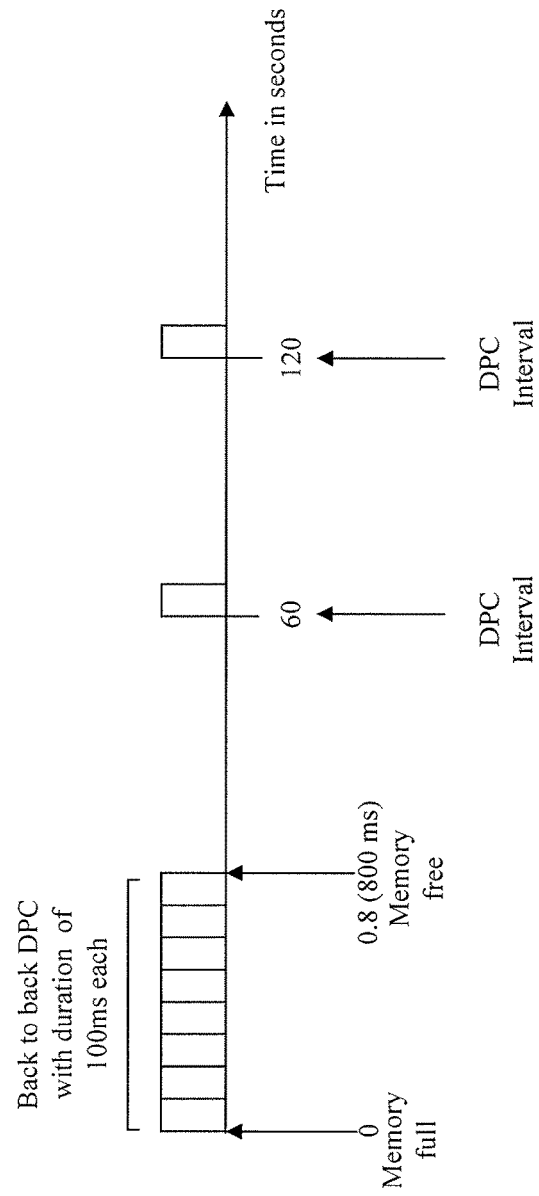

FIGS. 5A-5C are timing diagrams illustrating memory cleanup procedures based on various triggers in accordance with aspects of the present disclosure of the computer device 105 (e.g., server) operating memory management system 200. In accordance with various aspects of the present disclosure, two types of expiring events may be contemplated: an interval-based trigger (FIG. 5A) and/or a memory availability-based trigger (FIG. 5B). In some aspects, the two types of triggers may be performed sequentially (see e.g., FIG. 5C).

Turning first to FIG. 5A, an interval-based trigger system timing diagram 500 associated with an interval-based cleanup procedure of memory management system 200 is illustrated. In some examples, the interval-based trigger system may be implemented by the memory cleanup component 835 described with reference to FIG. 8. In accordance with the interval-based trigger, the computer device 105 operating memory management system 200 performs regular DPC cleanups at intervals defined by the cleanup interval parameter (e.g., DPC interval 445) when a sufficient amount of memory 230 is available (e.g., the memory 230 of the server exceeds a memory available threshold). For purposes of the present disclosure, the terms "cleanup interval parameter" and "cleanup interval value" may be used interchangeably. In some aspects, the interval at which the DPC is triggered may be dictated by the state-machine 400 of the computer device 105 (see FIG. 4) by adjusting the cleanup interval parameter (e.g., DPC interval 445).

In some aspects of the present disclosure, when the memory management system 200 is in the first state 405, the endpoint lifetime may be set to a lifetime default value (e.g., 60 seconds) and the DPC cleanup intervals may also be interval default value (e.g., 60 seconds). In some aspects, the DPC may be a kernel-mode procedures, and thus run for a predetermined maximum time period (e.g., 100 ms). Thus, in the illustrated diagram 500, the DPC may be triggered every 60 seconds, wherein at each trigger (time=0, 60, 120, 180 seconds), the DPC procedure may execute for 100 ms each. Accordingly, in some cases, the limitations of the 100 ms duration of the procedure may further limit the number of non-TCP endpoints that the computer device 105 may remove from the memory 230 at each trigger point. In some aspects of the present disclosure, the regular DPC may be triggered at the specified intervals in a round-robin fashion across all partitions 205, and each DPC may clean a single partition at any one time.

Turning next to FIG. 5B, a memory availability-based trigger timing diagram 505 associated with a memory availability-based procedure of memory management system 200 is illustrated. The memory availability-based trigger may be triggered in the wake of a memory pressure event (e.g., the memory 230 of the computer device 105 is less than the memory available threshold). In such instances when the memory 230 is low, the computer device 105 may execute a "back-to-back DPC" procedure until the memory low condition is eased. Particularly, the computer device 105, upon determining that the memory 230 of the computer device 105 is less than a memory available threshold, may trigger two or more consecutive DPC procedures to cleanup expired non-TCP packets from the memory 230 until the available amount of memory 230 exceeds the memory available threshold.

As was noted above, the DPC may be a kernel-mode procedure, and thus run for a predetermined maximum time period (e.g., 100 ms). Thus in the memory availability-based trigger system, the computer device 105 may execute the DPC in back to back segments for 100 ms each. Thus, as illustrated in diagram 505, the computer device 105 may execute the DPC procedures continuously (e.g., for 800 ms total) until such time that the available memory returns to acceptable levels.

Aspects of the present disclosure provide multiple methods of determining whether the memory 230 of the computer device 105 satisfies a memory available threshold. In one example, a low memory flag (e.g., "LowNonPagedPoolCondition" flag) may be employed such that the flag is set when the amount of free memory falls below a system defined memory available threshold. In such situations, DPC may be run back-to-back, e.g., consecutively, until the memory condition is eased as illustrated in FIG. 5B.

In contrast, when a high memory flag (e.g., "HighNonPagedPoolCondition" flag) is set, the computer device 105 may recognize that the memory 230 of the computer device 105 exceeds a memory available threshold, and thus may schedule an interval-based DPC cleanup (see FIG. 5A). Thus the one or more flags may operate as trigger signals to determine which of the two cleanup procedures to execute.

Finally, FIG. 5C illustrates a timing diagram 515 associated with a combined cleanup procedure of memory management system 200, where the two DPC procedures (interval-based and memory availability-based) may be executed sequentially based on one or more memory conditions observed by the computer device 105. Thus the timing diagram 515 illustrates the system behavior and DPC execution when the memory 230 starts to be full (e.g., at Time=0 seconds) and when the full memory condition is eased (e.g., at Time=0.8 seconds). Thus, so long as the system memory is less than the memory available threshold, the DPC may be executed back-to-back and continue to expire endpoints until the low memory condition is eased. When the available memory exceeds the memory available threshold, the DPC may revert to being executed at regular intervals based on the cleanup interval value/parameter specified by the computer device 105.

Figure 6:
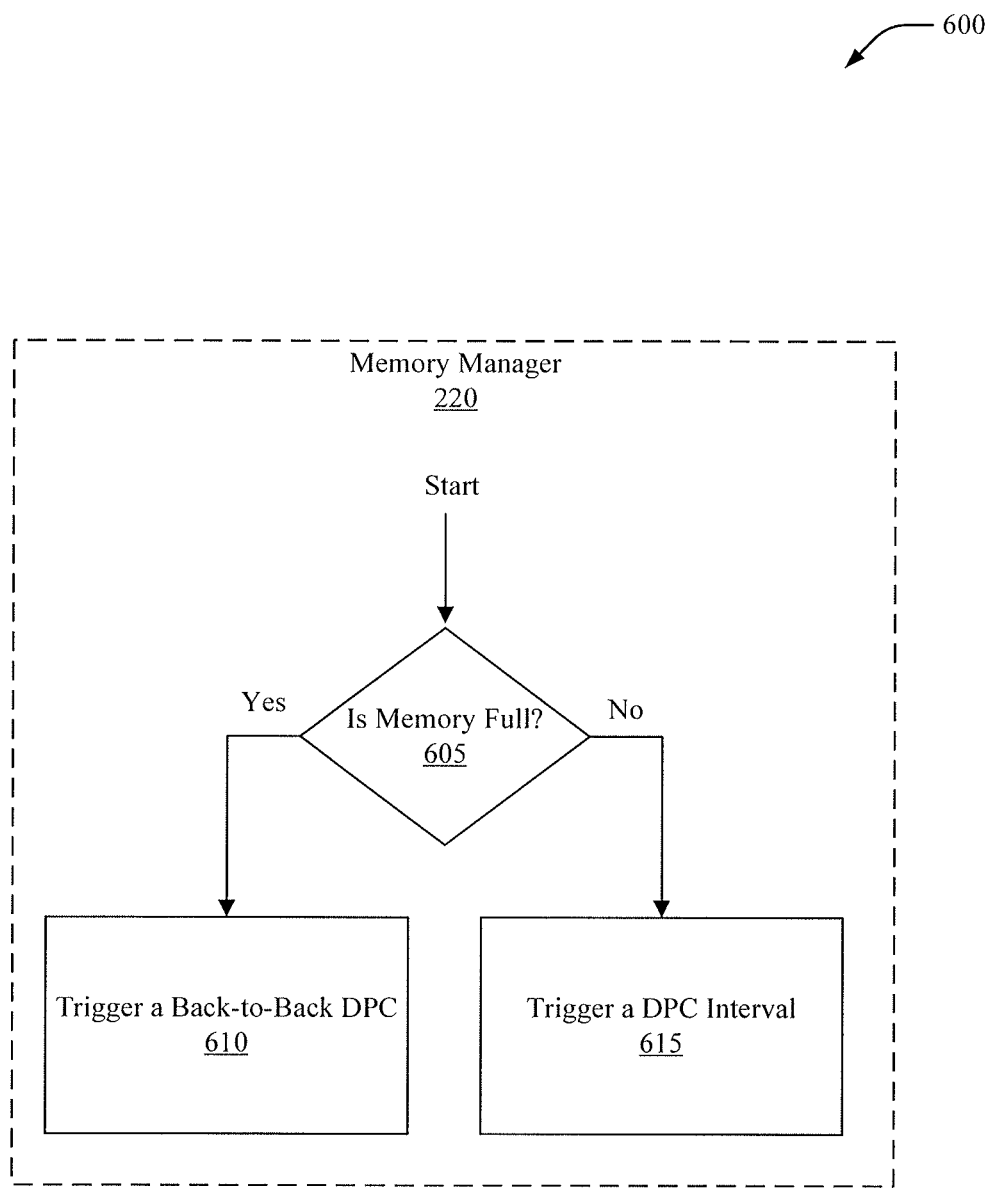
FIG. 6 is a flowchart of a method, implemented by the computer device, for selecting one or more cleanup procedure(s) based on memory availability trigger.

FIG. 6 is a flowchart of a method 600, implemented by the computer device 105 operating memory management system 200, for selecting one or more cleanup procedure(s) based on memory availability trigger. In some examples, the method 600 may be performed by the memory manager 220 and/or the processor 805 (see FIG. 8) associated with the computer device 105. In some examples, the memory manager 220 may be an example of the memory manager 220 described with reference to FIG. 2.

In some examples, in addition to implementing an interval based cleanup of the memory, the memory manager 220 may trigger an immediate DPC to cleanup expired non-TCP from memory when the available memory is (or near) full. Thus, at block 605, the memory manager 220 may determine whether the memory 230 (i.e., one or more partitions 205 of the memory 230) have an amount of free memory space less than a memory available threshold. The memory available threshold value may be either predetermined or dynamically adjusted based on number of requests being processed by the computer device 105.

If, at block 605, the memory manager 220 determines that the amount of free memory space in memory 230 of the computer device 105 is less than a memory available threshold, the memory manager 220 may trigger a back-to-back DPC procedure 610 (see FIG. 5B) to cleanup expired non-TCP packets from the memory until such time that the amount of free memory space in memory 230 exceeds the memory available threshold. In contrast, if, at block 605, the memory manager 220 determines that the amount of free memory space in memory 230 exceeds the memory available threshold, the memory manager 220 may trigger a DPC interval procedure 615 (see FIG. 5A). In some aspects, the memory manager 220 may continue the method 600 in a loop as it continuously analyzes and monitors the utilization of memory 230.

Figure 7:
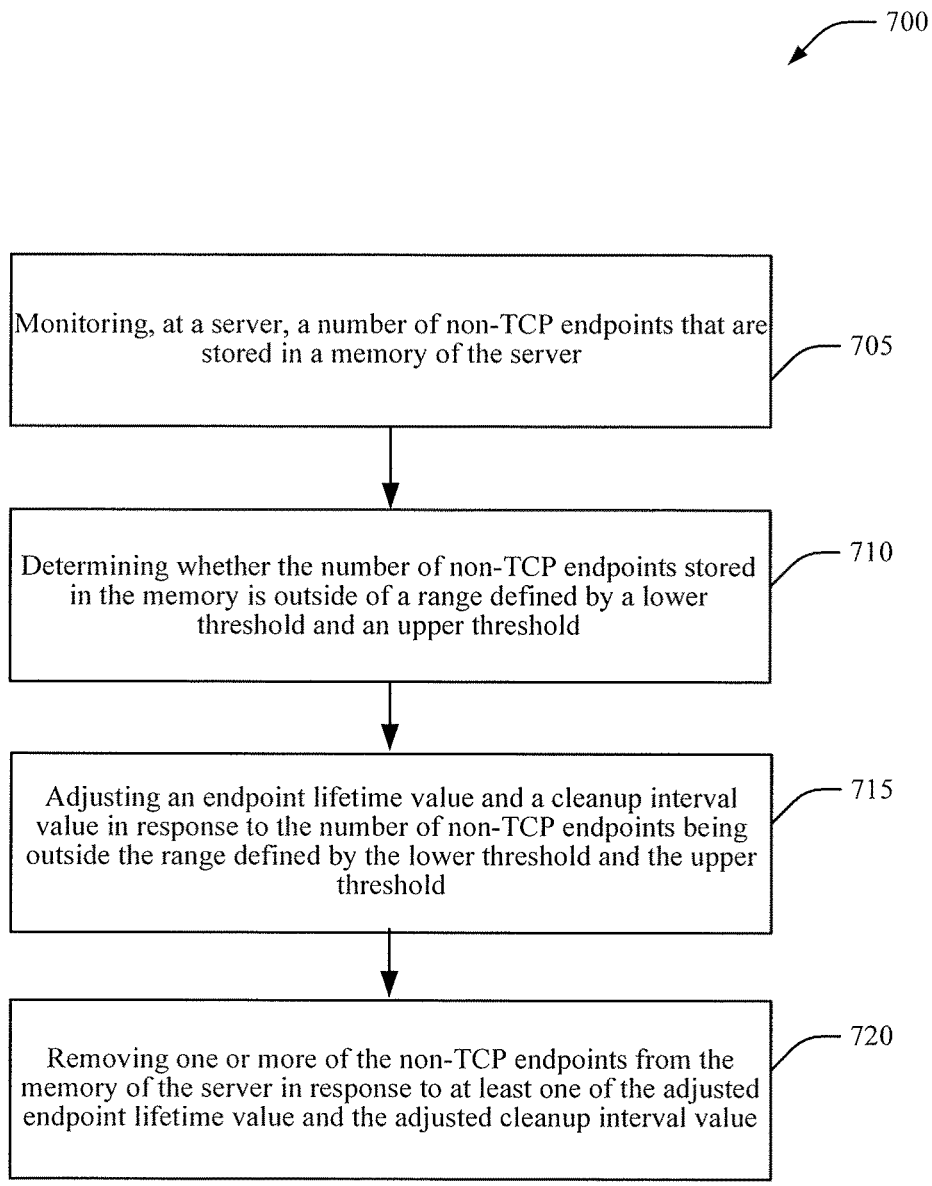
FIG. 7 is a flow chart of a method implemented on the computer device in accordance with various aspects of the present disclosure.

FIG. 7 is a flowchart of an example method 700 of the state machine for managing endpoint lifetime and Deferred Procedure Call (DPC) cleanup interval based on either the number of non-TCP traffic stored in the memory or the memory utilization factor. The method 700 may be performed by the computer device 105 (e.g., server) operating memory management system 200 as described with reference to FIGS. 1-6. Although the method 700 is described below with respect to the elements of the computer device 105, other components may be used to implement one or more of the steps described herein.

At block 705, the method 700 may include monitoring, at a server, a number of non-TCP endpoints that are stored in a memory of the server. In some aspects, the computer device 105 may include a non-TCP endpoint identifier component 825 (see FIG. 8) configured to monitor the number of non-TCP endpoints stored in one or more partitions of the memory.

At block 710, the method 700 may include determining whether the number of non-TCP endpoints stored in the memory is outside of a range defined by a lower threshold and an upper threshold. In some examples, the computer device 105 may operate non-TCP endpoint identifier component 825 (see FIG. 8) to determine whether the number of non-TCP endpoints is outside the range of the upper endpoint threshold and a lower endpoint threshold.

Additionally or alternatively, the non-TCP endpoint identifier component 825 may further monitor the memory utilization factor associated with the memory of the server, and determine whether the non-TCP endpoint parameter (e.g., when the non-TCP endpoint parameter represents memory utilization factor) is outside of a range of lower memory utilization threshold and an upper memory utilization threshold). As noted above, aspects of the present disclosure allow for a system to transition between a plurality of states depending on the number of endpoints, N, and the level of memory utilization, U, that may be stored in the system (e.g., in one or more partitions of the memory). If the number of non-TCP endpoints exceeds an upper endpoint threshold (e.g., 2,000 endpoints for first threshold value), the computer device 105 may transition to the next state where the endpoint lifetime may be shortened and the cleanup interval frequency increased in order to allow the server to prune more endpoints as their numbers increase in the memory. Similarly, if the memory utilization exceeds the upper memory threshold (e.g., 0.25 or 25 percentage of total memory), the computer device 105 may transition to the next state where the endpoint lifetime may be shortened and the cleanup interval frequency increased in order to allow the server to prune more endpoints as their numbers increase in the memory.

In some aspects, at the next state (e.g., state 410 in FIGS. 4A and 4B), the non-TCP endpoint identifier component 825 may again monitor the memory utilization factor associated with the memory of the server, and determine whether the non-TCP endpoint parameter (e.g., when the non-TCP endpoint parameter represents memory utilization factor) is outside of a range of lower memory utilization threshold (e.g., U=0.25) and an upper memory utilization threshold (e.g., U=0.50). If the non-TCP endpoint parameter exceeds the upper memory utilization threshold, the non-TCP endpoint identifier component 825 may be configured to further transition to next state (e.g., state 415 in FIGS. 4A and 4B) where the cleanup procedures may be more aggressive (e.g., via reduced endpoint lifetime value and cleanup interval). In contrast, if the non-TCP endpoint parameter is less than the lower threshold (e.g., U=0.25), the non-TCP endpoint identifier component 825 may return to the previous state (e.g., state 405 in FIGS. 4A and 4B). Even further, if the non-TCP endpoint parameter is not outside of a range of lower memory utilization threshold and an upper memory utilization threshold, the non-TCP endpoint identifier component 825 may maintain the computer device at its current state (e.g., state 410 in FIGS. 4A and 4B).

At block 715, the method 700 may include adjusting an endpoint lifetime value and a cleanup interval value in response to the number of non-TCP endpoints being outside the range defined by the lower threshold and the upper threshold. For example, in an aspect, the computer device 105 may operate a memory parameter adjustment component 830 (see FIG. 8) to adjust the endpoint lifetime value and the cleanup interval value based on determining that the number of non-TCP endpoints and/or memory utilization are outside the range of lower threshold and the upper threshold. As discussed above, adjusting the endpoint lifetime value and the cleanup interval value may be needed in order to maintain an optimal level of free memory in the system while improving overall connection speed, firewall speeds, security, and system performance in terms of CPU utilization and memory consumption. In some examples, memory parameter adjustment component 830 may adjust the endpoint lifetime value and the cleanup interval value by decreasing the endpoint lifetime value and the cleanup interval value from a default value when the number of non-TCP endpoints and/or memory utilization exceeds the threshold. In some aspects, the default values may be different for each of the endpoint lifetime value parameter and the cleanup interval value parameter. For example, a first default value associated with the endpoint lifetime value may be set at 60 seconds, while a second default value associated with the cleanup interval value may be set to 50 seconds. In other examples, the default values for both endpoint lifetime and cleanup interval may be the same.

Thus, if the number of non-TCP endpoints and/or memory utilization exceeds the upper threshold (e.g., N=2,000 endpoints or U=0.25 for first threshold value), the computer device 105 executing memory parameter adjustment component 830 may shorten the endpoint lifetime value from 60 seconds to 30 seconds for the next state. Concurrently, the computer device 105 may also shorten the cleanup interval value from 60 seconds to, for example, 40 seconds for the next state. Thus, in some aspects, memory parameter adjustment component 830 may decrease the endpoint lifetime value by reducing an idle threshold that specifies a length of time that a non-TCP endpoints has to be inactive to be classified as idle in the memory 230. Similarly, memory parameter adjustment component 830 may decrease the cleanup interval value by decreasing a time interval that the computer device 105 waits before triggering a DPC to cleanup expired endpoints from the memory 230.

If, at the subsequent state, the number of non-TCP endpoints and/or memory utilization is less than the lower threshold (e.g., N=2,000 endpoints or U=0.25), the computer device 105 executing memory parameter adjustment component 830 may increase the endpoint lifetime value and the cleanup interval value from the default value (or the previously adjusted values). Therefore, in some examples, memory parameter adjustment component 830 may increase the endpoint lifetime value by increasing an idle threshold that specifies a length of time that a non-TCP endpoints has to be inactive to be classified as idle in the memory 230, and may increase the cleanup interval value by increasing a time interval that the computer device 105 waits before triggering a deferred procedure call (DPC) to cleanup expired endpoints from the memory 230. Similarly, if, at a given state (e.g., state 410 in FIGS. 4A and 4B), the number of non-TCP endpoints and/or memory utilization exceeds the upper threshold (e.g., N=3,000 endpoints or U=0.50), the computer device 105 executing memory parameter adjustment component 830 may further decrease the endpoint lifetime value and the cleanup interval value from the default value (or the previously adjusted values). In such aspects, the computer device 105 dynamically monitors whether the non-TCP endpoint parameter is outside of a range of a lower threshold and upper threshold prior to adjusting (or maintaining) the endpoint lifetime value and the cleanup interval value.

At block 720, the method 700 may include removing one or more of the non-TCP endpoints from the memory of the server in response to at least one of the adjusted endpoint lifetime value and the adjusted cleanup interval value. In some examples, removing the one or more of non-TCP endpoints from the memory includes removing one or more idle non-TCP endpoints from the memory. For example, in an aspect, the computer device 105 may operate a memory cleanup component 835 (see FIG. 8) to remove a plurality of idle non-TCP endpoints from the memory 230 based on the endpoint lifetime value and the cleanup interval value. In some examples, removing the plurality of non-TCP endpoints from the memory may include memory cleanup component 835 initiating a DPC procedures to clean up the non-TCP endpoints from one or more partitions in the memory. In some aspects, memory cleanup component 835 may remove idle non-TCP endpoints uniformly across all partitions 205 in memory 230.

Figure 8:
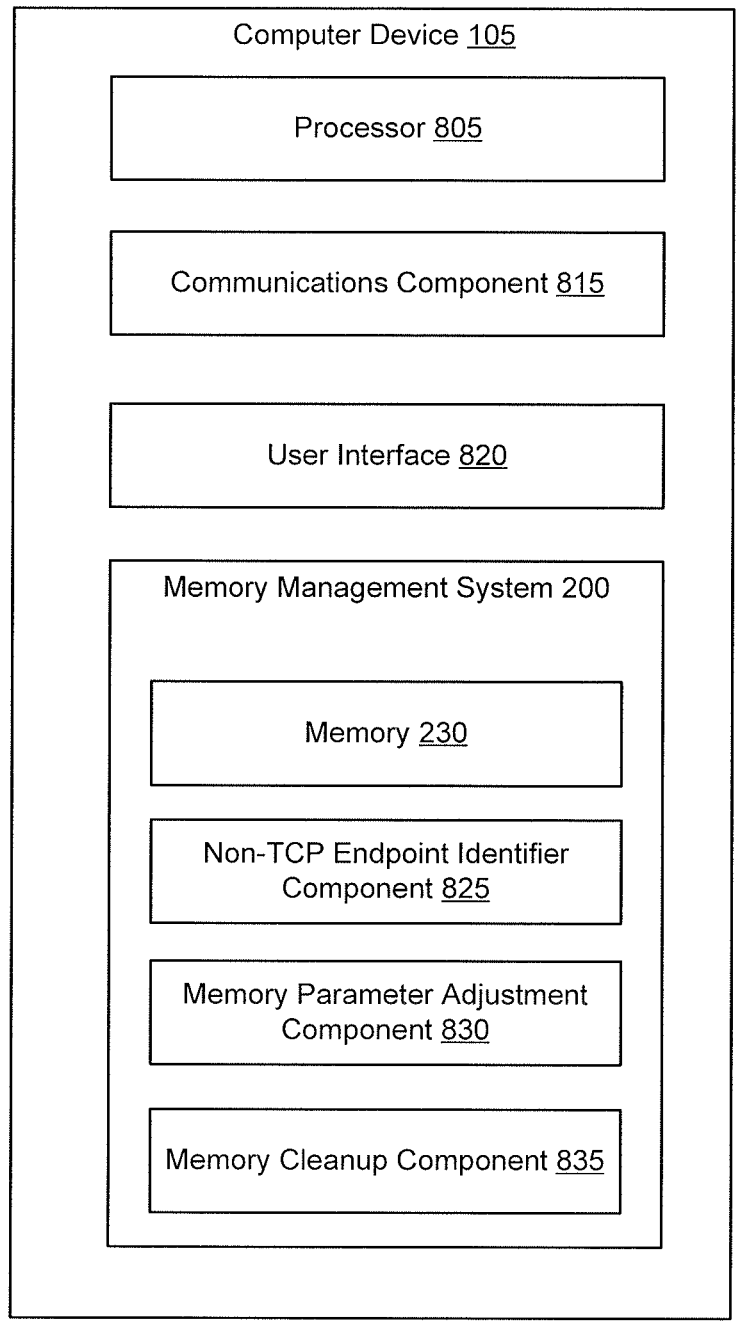
FIG. 8 is a diagram illustrating an example of a hardware implementation for a computer device in accordance with various aspects of the present disclosure.

Referring now to FIG. 8, illustrated is an example computer device 105 in accordance with an aspect, including additional component details as compared to FIG. 1. In some examples, the computer device 105 may be an example of a server described with reference to FIGS. 1 and 2. In one aspect, computer device 105 may include processor 805 for carrying out processing functions associated with one or more of components and functions (e.g., methods 300, 600, 700, and state machine 400) described herein. Processor 805 can include a single or multiple set of processors or multi-core processors. Moreover, processor 805 can be implemented as an integrated processing system and/or a distributed processing system. In one or more examples, the state machine 400 may be implemented or executed by the processor 805.

Computer device 105 may further include memory 230, such as for storing local versions of applications being executed by processor 805. In some examples, the operations of the memory 810 may be managed by the processor 805 or the memory manager 220 described with reference to FIG. 2 and FIG. 6. Memory 230 can include a type of memory usable by a computer, such as random access memory (RAM), read only memory (ROM), tapes, magnetic discs, optical discs, volatile memory, non-volatile memory, and any combination thereof. Additionally, processor 805 and memory 230 may include and execute operating system (not shown).

Further, computer device 105 may include a communications component 815 that provides for establishing and maintaining communications with one or more parties utilizing hardware, software, and services as described herein. Communications component 815 may carry communications between components on computer device 105, as well as between computer device 105 and external devices, such as devices located across a communications network and/or devices serially or locally connected to computer device 105. For example, communications component 815 may include one or more buses, and may further include transmit chain components and receive chain components associated with a transmitter and receiver, respectively, operable for interfacing with external devices.

Computer device 105 may also include a user interface component 820 operable to receive inputs from a user of computer device 105 and further operable to generate outputs for presentation to the user. User interface component 820 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 820 may include one or more output devices, including but not limited to a display, a speaker, a haptic feedback mechanism, a printer, any other mechanism capable of presenting an output to a user, or any combination thereof.

Computer device 105 may additionally include memory management system 200 operating one or more components defining memory manager 220 and state machine 400. For example, memory management system 200 includes non-TCP endpoint identifier component 825 operable for identifying a number of non-TCP endpoints that may be idle in a memory of the server and determining whether the number of non-TCP endpoints exceeds an endpoint threshold. In addition, memory management system 200 may include a memory parameter adjustment component 830 operable to adjust one or more parameters associated with the non-TCP endpoints. For example, the memory parameter adjustment component 830 may be configured to adjust an endpoint lifetime value and the cleanup interval value that is associated with the endpoint threshold.

Additionally or alternatively, memory management system 200 may include memory cleanup component 835 operable for initiating memory cleanup based on a trigger from the processor 805 or memory manager 220 (see FIG. 2). In some aspects, the memory cleanup component 835 may remove a plurality of non-TCP endpoints from the one or more partitions of the memory of the computer device 105 based on the endpoint lifetime value and the cleanup interval value allocated by the memory parameter adjustment component 830.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 105), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method of managing non-Transmission Control Protocol (TCP) packets comprising:
    monitoring, at a server, a number of non-TCP endpoints that are stored in a memory of the server;
    determining whether the number of non-TCP endpoints stored in the memory is outside of a range defined by a lower threshold and an upper threshold;
    adjusting an endpoint lifetime value and a cleanup interval value in response to the number of non-TCP endpoints being outside the range defined by the lower threshold and the upper threshold; and
    removing one or more of non-TCP endpoints from the memory of the server in response to at least one of the adjusted endpoint lifetime value and the adjusted cleanup interval value.

2. The method of claim 1, wherein adjusting the endpoint lifetime value and the cleanup interval value in response to the number of non-TCP endpoints being outside the range defined by the lower threshold and the upper threshold, comprises:
    decreasing the endpoint lifetime value and the cleanup interval value from a default value if the number of non-TCP endpoints exceeds the upper threshold; and
    increasing the endpoint lifetime value and the cleanup interval value from the default value if the number of non-TCP endpoints is less than the lower threshold.

3. The method of claim 2, wherein decreasing the endpoint lifetime value comprises reducing an idle threshold that specifies a length of time that a non-TCP endpoint has to be inactive to be classified as idle in the memory, and
    wherein decreasing the cleanup interval value comprises decreasing a time interval that the server waits before triggering a memory cleanup operation to cleanup expired endpoints from the memory.

4. The method of claim 2, wherein increasing the endpoint lifetime value comprises increasing an idle threshold that specifies a length of time that a non-TCP endpoint has to be inactive to be classified as idle in the memory, and
    wherein increasing the cleanup interval value comprises increasing a time interval that the server waits before triggering a memory cleanup operation to cleanup expired endpoints from the memory.

5. The method of claim 1, further comprising:
    identifying, at the server, a number of active cores in a system;
    determining a number of partitions to generate in the memory of the server based on the number of active cores, wherein each of the number of partitions includes a unique reader-writer lock; and
    distributing incoming non-TCP packets uniformly across the number of partitions.

6. The method of claim 1, wherein removing the one or more of non-TCP endpoints from the memory of the server in response to at least one of the adjusted endpoint lifetime value and the adjusted cleanup interval value comprises:
    removing one or more of idle non-TCP endpoints uniformly from across a plurality of memory partitions.

7. The method of claim 1, further comprising:
    determining that an amount of free space in the memory of the server is less than a memory available threshold; and
    triggering a memory cleanup operation to cleanup expired non-TCP packets from the memory until the amount of free space in the memory of the server exceeds the memory available threshold.

8. The method of claim 1, wherein the number of non-TCP endpoints corresponds to a number of non-TCP connections including a local endpoint and a remote endpoint.

9. A computing device for managing non-Transmission Control Protocol (TCP) packets comprising:
a processor;
a memory coupled to the processor, wherein the memory includes instructions executable by the processor to:
monitor, at a server, a number of non-TCP endpoints that are stored in the memory of the server;
determine whether the number of non-TCP endpoints stored in the memory is outside of a range defined by a lower threshold and an upper threshold;
adjust an endpoint lifetime value and a cleanup interval value in response to the number of non-TCP endpoints being outside the range defined by the lower threshold and the upper threshold; and
remove one or more of non-TCP endpoints from the memory of the server in response to at least one of the adjusted endpoint lifetime value and the adjusted cleanup interval value.

10. The computing device of claim 9, wherein the instructions executable by the processor to adjust the endpoint lifetime value and the cleanup interval value in response to the number of non-TCP endpoints being outside the range defined by the lower threshold and the upper threshold, further includes instructions to:
decrease the endpoint lifetime value and the cleanup interval value from a default value when the number of non-TCP endpoints exceeds the upper threshold; and
increase the endpoint lifetime value and the cleanup interval value from the default value when the number of non-TCP endpoints is less than the lower threshold.

11. The computing device of claim 10, wherein the instructions executable by the processor to decrease the endpoint lifetime value comprises reducing an idle threshold that specifies a length of time that a non-TCP endpoint has to be inactive to be classified as idle in the memory, and
wherein the instructions executable by the processor to decrease the cleanup interval value comprises instructions to decrease a time interval that the server waits before triggering a memory cleanup operation to cleanup expired endpoints from the memory.

12. The computing device of claim 10, wherein the instructions executable by the processor to increase the endpoint lifetime value comprises instructions to increase an idle threshold that specifies a length of time that a non-TCP endpoint has to be inactive to be classified as idle in the memory, and
wherein the instructions executable by the processor to increase the cleanup interval value comprises instructions to increase a time interval that the server waits before triggering a memory cleanup operation to cleanup expired endpoints from the memory.

13. The computing device of claim 9, wherein the instructions are further executable by the processor to:
identify, at the server, a number of active cores in a system;
determine a number of partitions to generate in the memory of the server based on the number of active cores, wherein each of the number of partitions includes a unique reader-writer lock; and
distribute incoming non-TCP packets uniformly across the number of partitions.

14. The computing device of claim 9, wherein the instructions are further executable by the processor to:
remove a plurality of idle non-TCP endpoints uniformly from across a plurality of memory partitions.

15. The computing device of claim 9, wherein the instructions are further executable by the processor to:
determine that an amount of free space in the memory of the server is less than a memory available threshold; and
trigger a memory cleanup operation to cleanup expired non-TCP packets from the memory until the amount of free space in the memory of the server exceeds the memory available threshold.

16. A non-transitory computer-readable medium for managing non-Transmission Control Protocol (TCP) packets comprising instructions for:
monitoring, at a server, a number of non-TCP endpoints that are stored in a memory of the server;
determining whether the number of non-TCP endpoints stored in the memory is outside of a range defined by a lower threshold and an upper threshold;
adjusting an endpoint lifetime value and a cleanup interval value in response to the number of non-TCP endpoints being outside the range defined by the lower threshold and the upper threshold; and
removing one or more of non-TCP endpoints from the memory of the server in response to at least one of the adjusted endpoint lifetime value and the adjusted cleanup interval value.

17. The non-transitory computer-readable medium of claim 16, wherein the instructions for adjusting the endpoint lifetime value and the cleanup interval value in response to the number of non-TCP endpoints being outside the range defined by the lower threshold and the upper threshold further include instructions for:
decreasing the endpoint lifetime value and the cleanup interval value from a default value if the number of non-TCP endpoints exceeds the upper threshold; and
increasing the endpoint lifetime value and the cleanup interval value from the default value if the number of non-TCP endpoints is less than the lower threshold.

18. The non-transitory computer-readable medium of claim 17, wherein the instructions for decreasing the endpoint lifetime value comprises instructions for reducing an idle threshold that specifies a length of time that a non-TCP endpoint has to be inactive to be classified as idle in the memory, and
wherein the instructions for decreasing the cleanup interval value comprises instructions for decreasing a time interval that the server waits before triggering a memory cleanup operation to cleanup expired endpoints from the memory.

19. The non-transitory computer-readable medium of claim 17, wherein the instructions for increasing the endpoint lifetime value further comprise instructions for increasing an idle threshold that specifies a length of time that a non-TCP endpoint has to be inactive to be classified as idle in the memory, and
wherein the instructions for increasing the cleanup interval value further comprise instructions for increasing a time interval that the server waits before triggering a memory cleanup operation to cleanup expired endpoints from the memory.

20. The non-transitory computer-readable medium of claim 16, wherein the instructions are further executable for:
identifying, at the server, a number of active cores in a system;
determining a number of partitions to generate in the memory of the server based on the number of active cores, wherein each of the number of partitions includes a unique reader-writer lock; and
distributing incoming non-TCP packets uniformly across the number of partitions.

* * * * *